Nov. 6, 1962 — L. A. JOHNSON — 3,061,920
METHOD OF ASSEMBLING MEMBERS
Filed Nov. 19, 1958
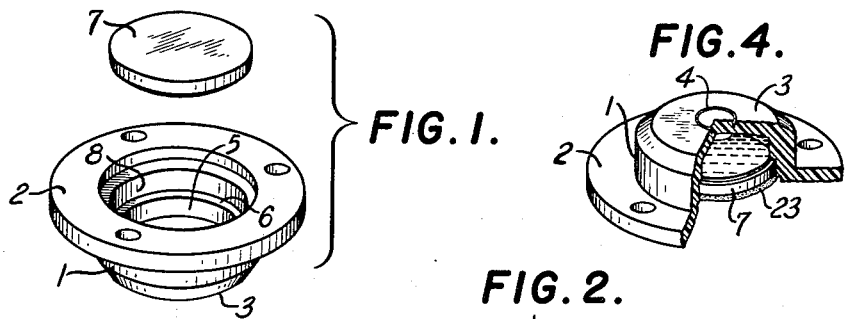
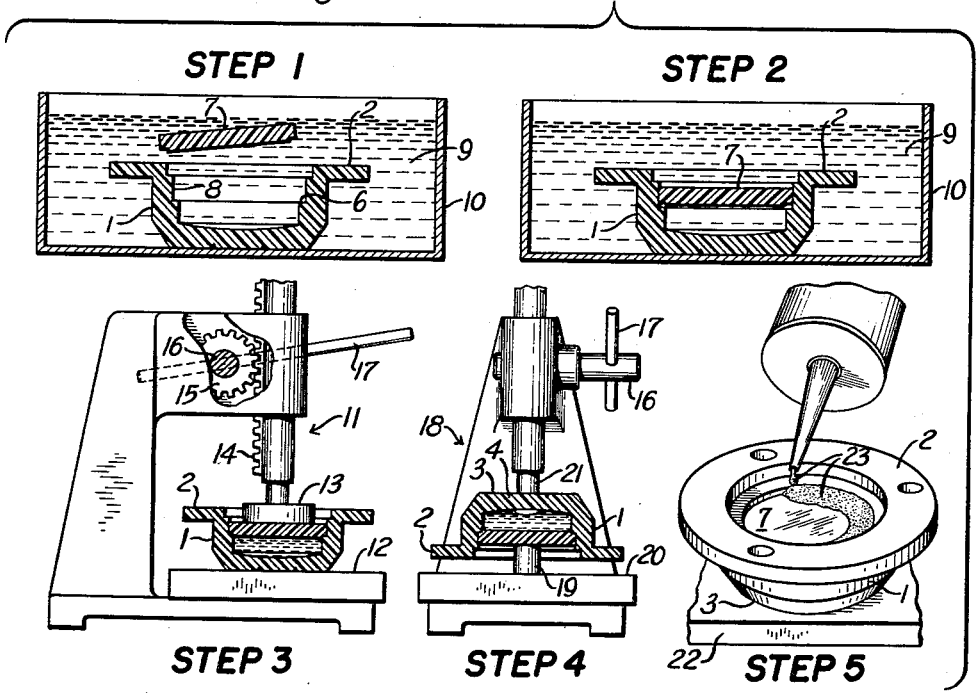
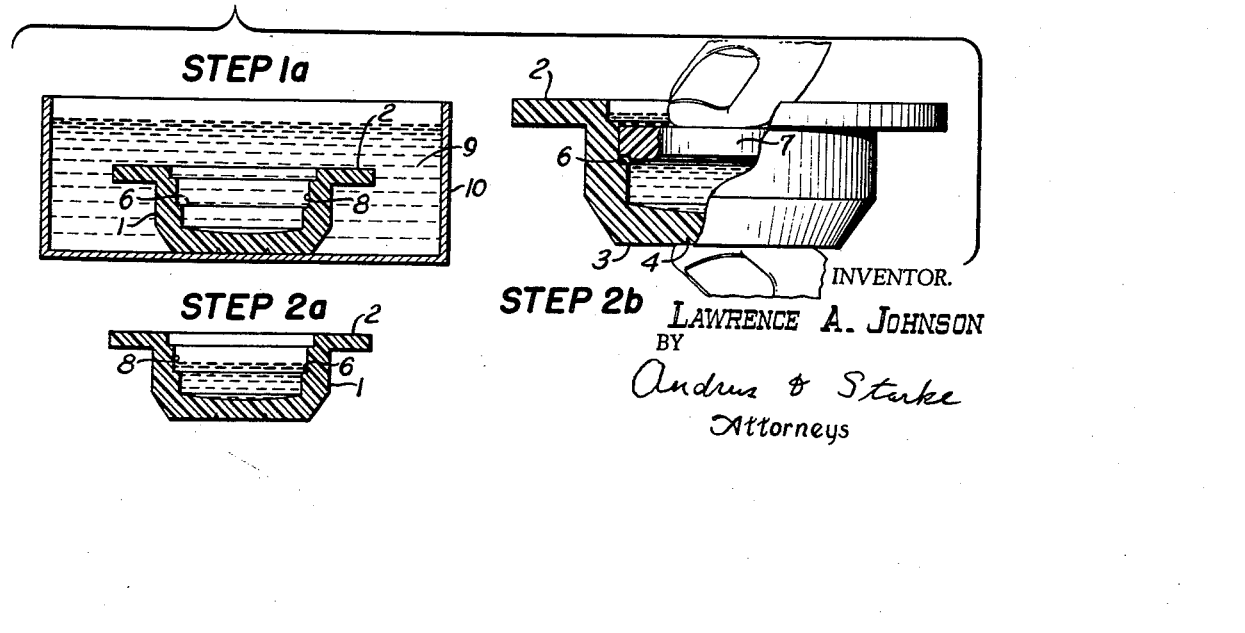
INVENTOR.
LAWRENCE A. JOHNSON
BY
Andrus & Starke
Attorneys

3,061,920
METHOD OF ASSEMBLING MEMBERS
Lawrence A. Johnson, Milwaukee, Wis., assignor of one-half to George Johnson, Mequon, Wis.
Filed Nov. 19, 1958, Ser. No. 775,083
5 Claims. (Cl. 29—445)

This invention relates to a method of assembling members, and more particularly to a novel method of level assembly wherein an air bubble of suitable size is entrained within the level case.

In the manufacture of spirit levels, such as that disclosed in the co-pending application of the present inventor entitled, "Spirit Level for Horizontal Surfaces," Serial No. 731,532, filed April 28, 1958, now abandoned, two members were joined to form a cavity and a predetermined amount of suitable liquid was subsequently inserted into the cavity. The liquid was inserted by a hollow needle or the like through an opening in one of the members, and the opening was subsequently closed by a plug and then sealed. The amount of liquid inserted was measured to provide an air bubble of sufficient size for leveling purposes.

The above-mentioned method produced numerous manufacturing problems in that an opening was required in one of the members, special metering filling apparatus and a separate plug were necessary, and the plugged member produced an undesirable uneven appearance.

The method of the present invention eliminates the above objections, and is based on a novel concept utilizing the slight flexibility of the material from which the level is made.

The accompanying drawings illustrate the best mode presently contemplated by the inventor for carrying out the invention.

In the drawings:

FIGURE 1 is an exploded view of the level elements before assembly;

FIG. 2 is an illustration, partly in section, partly in side elevation, and partly in perspective, showing five steps in the assembly of the level;

FIG. 3 is an illustration, partly in section, of alternatives to steps 1 and 2 of FIG. 2; and FIG. 4 is a perspective view of a completed level with parts broken away and sectioned.

As best shown in FIGURE 1 of the drawings, the method of the invention is contemplated for use in, but not limited to, the assembly of a level having a round case 1 of molded, transparent slightly flexible material such as Plexiglas. Case 1 is of inverted cup shape and has an outwardly extending base flange 2 for supporting the level. The top 3 of case 1 is of large diameter relative to the depth of the case, and is provided with an index mark or groove 4 centrally thereof for leveling purposes.

The interior of case 1 provides a cavity or chamber 5 having a side wall with an annular shoulder 6 thereon for receiving an imperforate closing disc 7. The portion 8 of the side wall disposed outwardly of shoulder 6 is of substantially the same diameter as that of disc 7, with a minute clearance provided to permit insertion of the disc. It is essential that a reasonably tight fit be obtained. Disc 7 may be made of opaque plastic, such as Plexiglas, and when in engagement with shoulder 6 is disposed generally parallel to top 3.

The assembly method will now be described, it being understood that the method may be applied to other levels than the particular type described above. For example, it may be applied to a level of different shape or which is transparent throughout, and which has index marks on both top and bottom faces.

As shown in FIG. 2, Step 1, case 1 is first completely submerged in a level liquid 9 disposed in a container 10. Liquid 9 should be of a suitable spirit type, such as petroleum naptha or what is known as normal heptane. The liquid should not freeze in normal use, and should not foam when subject to shock. It should also be compatible with the plastic of the level.

Once case 1 is submerged and thus completely surrounded and filled with the spirit liquid, disc 7 is then inserted by manual or other means into the cavity 5 (FIG. 2, Step 2). The initial insertion will not normally position the disc against shoulder 6.

Insertion of disc 7 may be made alternately while case 1 is submerged, or after the case has been removed from liquid 9. In the former instance, case 1 may be placed in any position in the liquid; i.e., with top 3 uppermost or lowermost, or vertically disposed. In the latter instance, FIG. 3, Step 1a, case 1 must be submerged with flange 2 the cavity 5 uppermost, and raised from the liquid in the same position so that liquid will fill the cavity to at least the level of shoulder 6, and preferably above it (FIG. 3, Step 2a).

In both above instances, there will be no air bubble within the enclosed case after initial insertion of disc 7. When the disc is applied to the submerged case, there is no air nearby to enter the cavity. When the disc is applied to the raised case having liquid above the shoulder level, FIG. 3, Step 2b, fluid will be forced out of the cavity around the edge of the disc, and substantially no air can enter.

The partially inserted disc 7 is then forced into engagement with shoulder 6. To assure firm contact with the shoulder, it is preferable to utilize a mechanical device, such as an arbor press 11 to apply the necessary pressure. Press 11 is shown in FIG. 2, Step 3, and may take the form of a base 12 of relatively large plane surface area upon which the partially assembled level is positioned with flange 2 uppermost. A ram 13 having an end portion of slightly smaller diameter than disc 7 is mounted through a rack 14, pinion 15, shaft 16 and lever 17 for pressure engagement with disc 7 to force the latter onto shoulder 6. Lever 17 may be actuated manually or by any suitable means, not shown. It is important that the unsealed joint between case 1 and the marginal edge of disc 7 is sufficiently tight to prevent atmospheric pressure from forcing air into the level chamber.

If desired, in the form of method shown in FIG. 2, the container 10 with the partially assembled level therein, shown in Step 2, may be placed on base 12 and press 11 actuated while the level is submerged.

The partially assembled level is now ready for bubble insertion. This is accomplished by utilizing the slight flexibility of the plastic material. As seen in FIGURE 2, Step 4, the level may be placed in a second arbor press 18 similar to press 11, but having an upstanding projection 19 on its base 20. Projection 19 is sufficiently high to engage the central portion of disc 7 and support flange 2 above base 20 when the level is placed thereon. The diameter of projection 19 should be substantially smaller than that of disc 7. The press ram 21 is then lowered into engagement with top 3 and a slight squeezing pressure applied, which inwardly deflects top 3 and disc 7 to force a small amount of liquid out of cavity 5 around the disc. When ram 21 is released, top 3 and disc 7 will return to their unflexed position, and air will be sucked into cavity 5 around the disc to form a bubble.

While it would be desirable to form the bubble by a single controlled application of ram 21, it has been found that variables such as slight differences in level dimensions and also temperature, substantially prevent this. It has therefore, been found best to build up the bubble by lightly tapping ram 21 on case 1 repeatedly until the proper bubble size is obtained. The amount of air entrained by each tap can be observed visually by watching the size of the bubble in relation to index mark 4, with each tap providing an insertion of air substantially less than the total desired amount. Since liquid 9 is preferably of the type which does not foam upon shock, the partial bubble will not break up into minute bubbles, with each tap, and can be accurately observed at all times.

Once the proper bubble size is obtained, the level is ready for permanent sealing. It has been found that heat sealing is unnecessary, in view of certain recently developed sealing compounds. As shown in FIG. 2, Step 5, the assembled level with the entrained bubble is placed flange side up on a suitable horizontally level support 22. A suitable sealing material 23 is then poured into the slight receptacle formed by disc 7 and the outer end portion of the cavity wall. Material 23 will flow over the entire disc and sealingly join the disc edge and case 1, stopping all communication to or from cavity 5.

An epoxy resin adhesive mixed with equal parts of a suitable hardener, has been found very satisfactory as the sealant. This resultant mixture has 100% solids content, with no solvent or vehicle, and there is therefore no shrinkage away from the joints. The mixture known as "Resiweld" has been found suitable. Once the material is hard, it will have substantially the same coefficient of expansion as the plastic from which the level is molded.

The invention provides a novel method of assembling a level and forming the desired bubble. No complicated liquid metering mechanism is necessary, and only one sealing step is necessary, since there is no disc opening to be plugged.

The imperforate disc with a uniform inner surface eliminates the need for an extra plug, which is difficult and costly to mold and handle. Furthermore, the view downwardly through the index mark and bubble is not confused by any irregular surface therebeneath, facilitating more accurate leveling.

Various modes of carrying out the invention are contemplated as being within the scope of the following claims particularly pointing out and distinctly claiming the subject matter which is regarded as the invention.

I claim:
1. The method of entraining an air bubble in a liquid confined in a cavity formed by a plurality of flexible members joined at a substantially tight but unsealed joint, the steps comprising, applying pressure to the exterior of said members to thereby flex the same inwardly of the cavity and force liquid out of the cavity at said joint, subsequently releasing said pressure so that said members return to their unflexed positions with resultant entry of air through the joint into said cavity to form a bubble, and finally permanently sealing the joint between said members.

2. The method of entraining an air bubble in a liquid-filled level having a plurality of flexible members joined at a substantially tight but unsealed joint, comprising the steps of applying pressure to the exterior of said members to flex the same inwardly and force fluid out of the level at said joint, subsequently releasing said pressure so that said members return to their unflexed position with resultant entry of air through the joint into the level to form a bubble, and finally permanently sealing the joint between said members.

3. The method of claim 2 in which the pressure is applied by tapping at least one of said members a plurality of times.

4. The method of claim 3 in which each said tap is of a force to expel liquid and permit entry of gas into the said chamber through said joint and in an amount to form a bubble smaller than the final bubble desired.

5. The method of assembling a spirit level having a casing of two interfitting parts confining a spirit liquid with an air bubble, comprising first assembling said casing parts with the space therebetween completely filled with liquid and substantially devoid of air and with the joint between the parts tight, thereafter flexing at least one of said casing parts inwardly to expel liquid through said joint and permit entry of air upon return of said part or parts to unflexed position to form an air bubble in the liquid confined in said casing, and finally sealing the joint between the parts of said casing.

References Cited in the file of this patent

UNITED STATES PATENTS

| | | |
|---|---|---|
| 812,251 | Alexander | Feb. 13, 1906 |
| 2,316,777 | Fell | Apr. 20, 1943 |
| 2,356,311 | Geier | Aug. 22, 1944 |
| 2,746,651 | Lewis | May 22, 1956 |
| 2,782,524 | Vogt | Feb. 26, 1957 |
| 2,806,376 | Wood | Sept. 17, 1957 |
| 2,812,121 | Sheets | Nov. 5, 1957 |
| 2,872,763 | Meissner | Feb. 10, 1959 |
| 2,873,565 | Arneson | Feb. 17, 1959 |

FOREIGN PATENTS

| | | |
|---|---|---|
| 579,232 | Great Britain | July 29, 1946 |